United States Patent
Müller

(10) Patent No.: US 6,581,959 B2
(45) Date of Patent: Jun. 24, 2003

(54) AIRBAG DEVICE AND OPERATING METHOD FOR IT AS WELL AS VEHICLE INTERIOR PANELING WITH IT

(75) Inventor: Olaf Müller, Rüsselsheim (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/895,600

(22) Filed: Jun. 29, 2001

(65) Prior Publication Data

US 2002/0135162 A1 Sep. 26, 2002

(30) Foreign Application Priority Data

Jun. 29, 2000 (DE) .......................................... 200 11 391
Jul. 21, 2000 (DE) .......................................... 200 12 707

(51) Int. Cl.$^7$ ............................................... B60R 21/20
(52) U.S. Cl. ..................................... 280/728.3; 280/732
(58) Field of Search ............................. 280/728.3, 732, 280/728.2

(56) References Cited

U.S. PATENT DOCUMENTS

| | | | | |
|---|---|---|---|---|
| 4,773,673 A | * | 9/1988 | Sakurai | 280/728.3 |
| 5,219,177 A | * | 6/1993 | Wang | 280/728.3 |
| 5,316,335 A | * | 5/1994 | Gray et al. | 280/728.3 |
| 5,332,257 A | * | 7/1994 | Rogers et al. | 280/728.2 |
| 5,897,135 A | * | 4/1999 | Oehm | 280/728.3 |
| 5,899,488 A | * | 5/1999 | Muller | 280/728.3 |
| 5,971,431 A | * | 10/1999 | Wohllebe et al. | 280/728.3 |
| 6,068,286 A | * | 5/2000 | Heilig | 280/728.3 |
| 6,315,321 B1 | * | 11/2001 | Lutz | 280/728.3 |

FOREIGN PATENT DOCUMENTS

| | | |
|---|---|---|
| DE | 197 26 878 A1 | 10/1998 |
| DE | 197 33 896 A1 | 2/1999 |
| DE | 100 25 417 A1 | 11/2000 |
| DE | 100 13 759 A1 | 1/2001 |
| EP | 0 867 346 A1 | 9/1998 |
| EP | 1 059 210 A2 | 12/2000 |
| WO | WO 99/58389 | 11/1999 |
| WO | WO 99/61288 | 12/1999 |
| WO | WO 01/10684 A1 | 2/2001 |

* cited by examiner

*Primary Examiner*—Paul N. Dickson
*Assistant Examiner*—Laura B. Rosenberg
(74) *Attorney, Agent, or Firm*—Laurence A. Greenberg; Werner H. Stemer; Manfred Beck

(57) ABSTRACT

An airbag arrangement has an airbag flap which is arranged in a closed position in an airbag outlet opening in a vehicle interior paneling, and which, as a consequence of triggering of the airbag arrangement, can be moved with respect to a vehicle occupant out of the airing outlet opening into an open position behind the vehicle interior paneling by driving devices. The airbag flap is held in its closed position in the airbag outlet opening in a form-fitting manner by engagement devices and locking devices. The engagement devices are assigned only to one side of the airbag flap and the airbag outlet opening, and as a consequence of triggering of the airbag arrangement the locking devices can be released by the driving devices. A vehicle interior paneling and an operating method for an airbag arrangement are also provided.

33 Claims, 14 Drawing Sheets

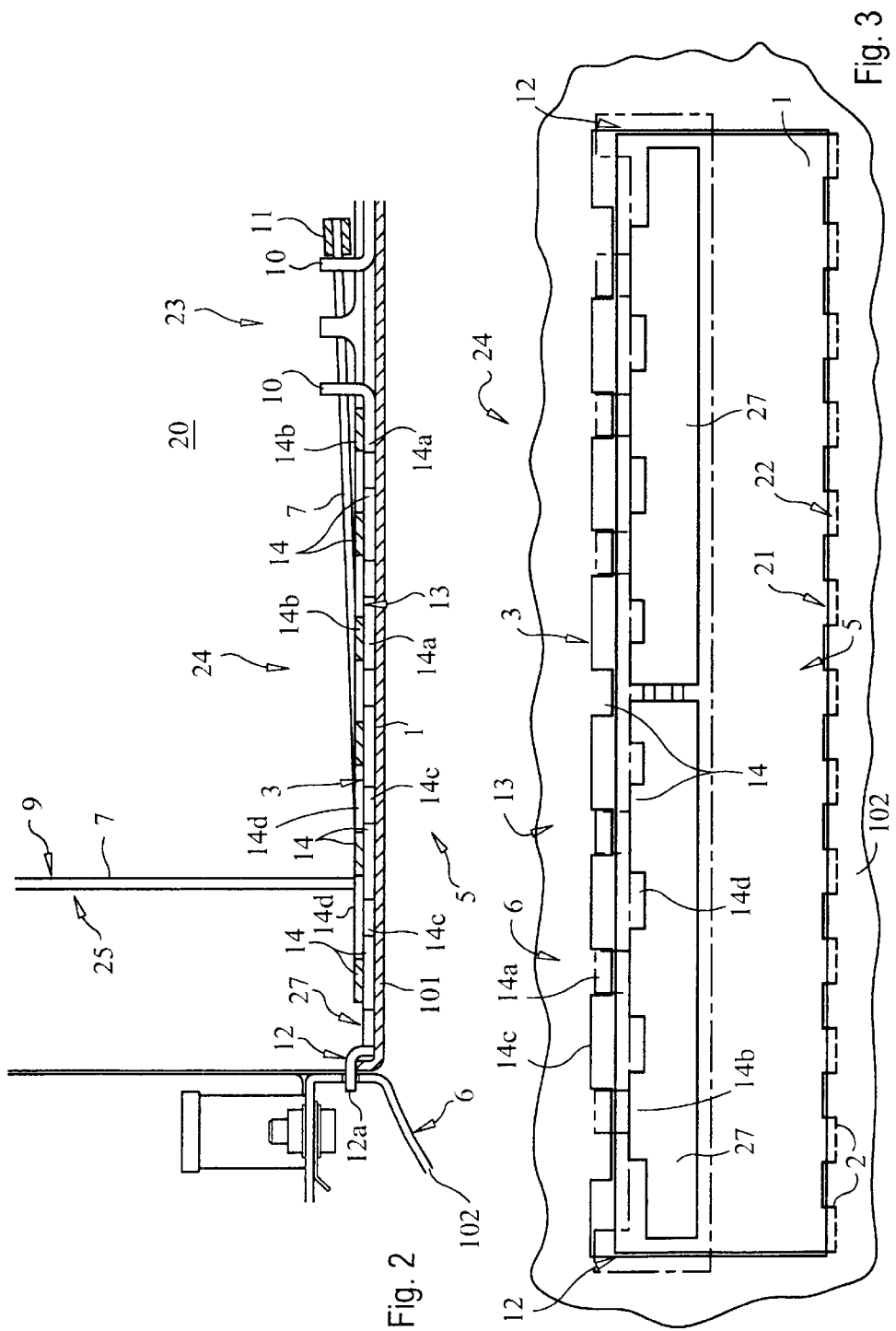

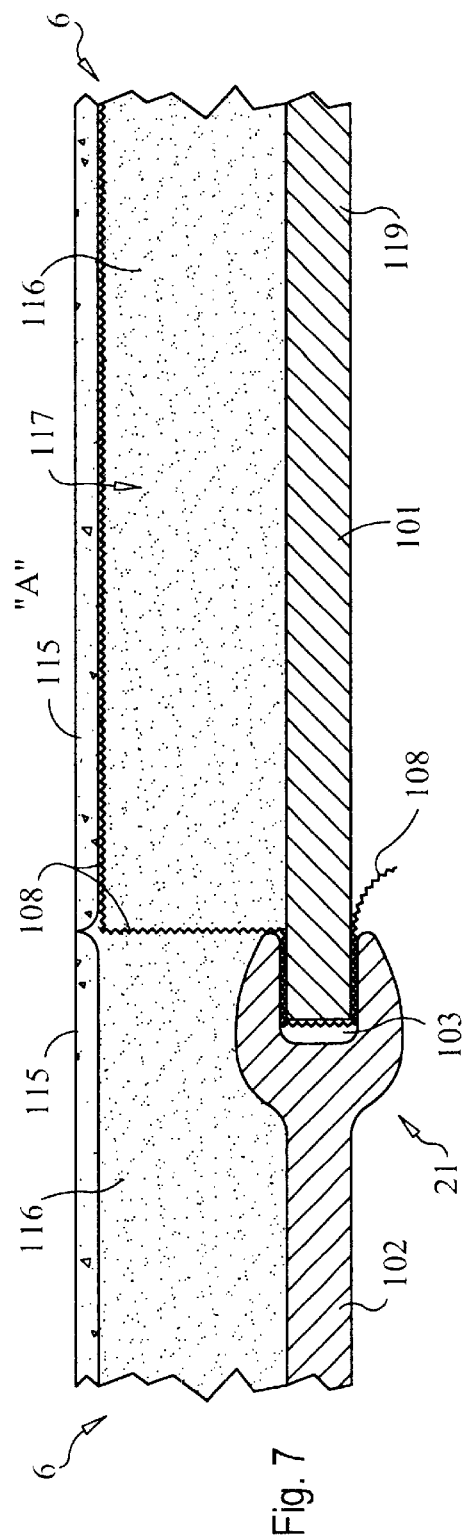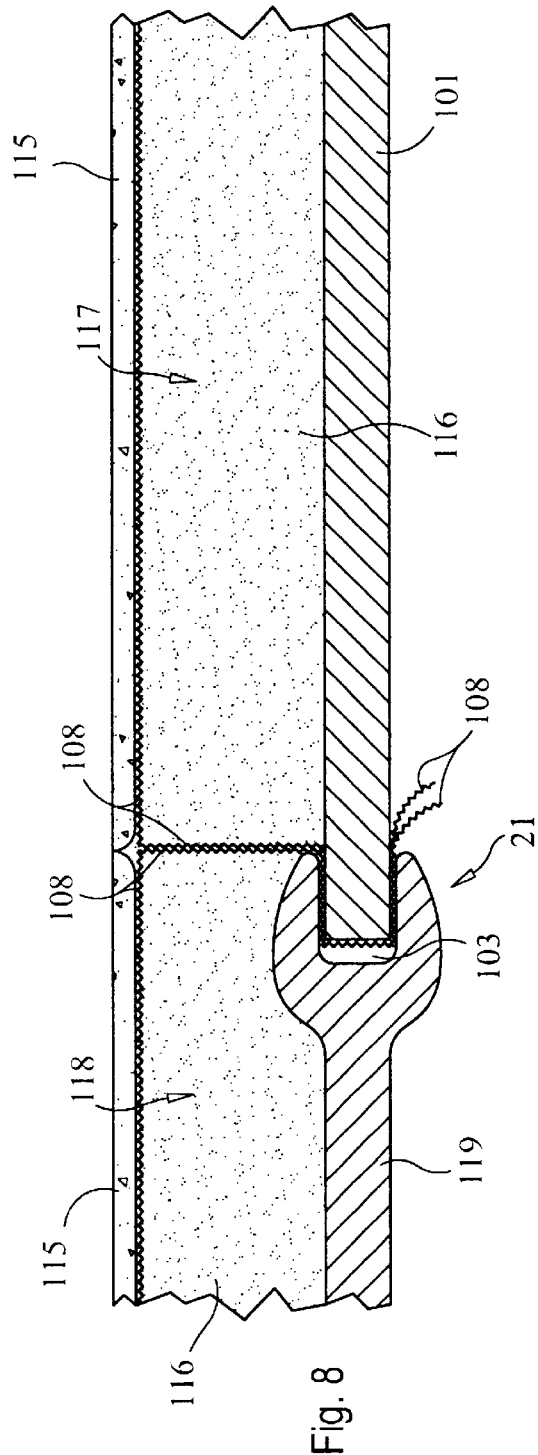

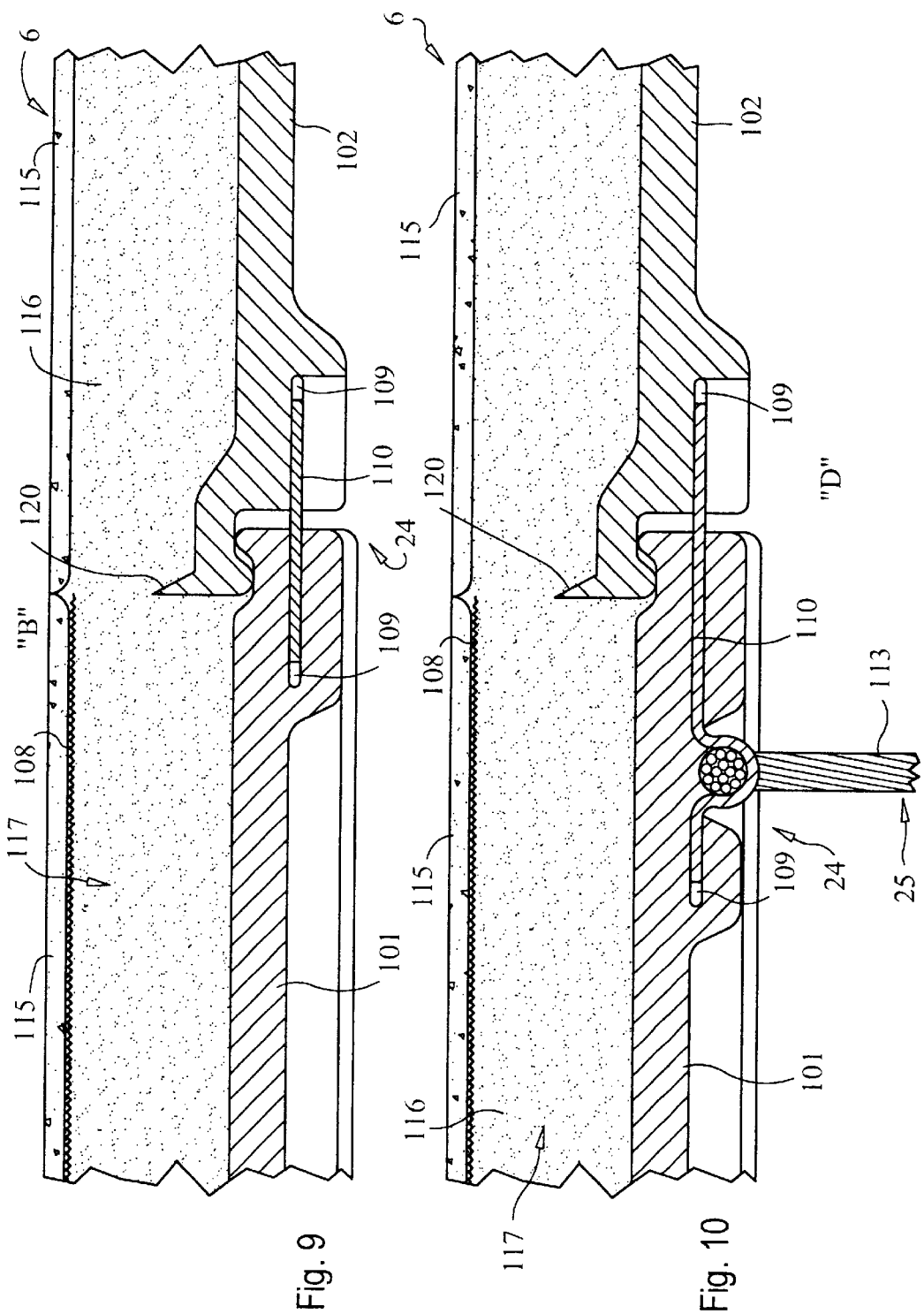

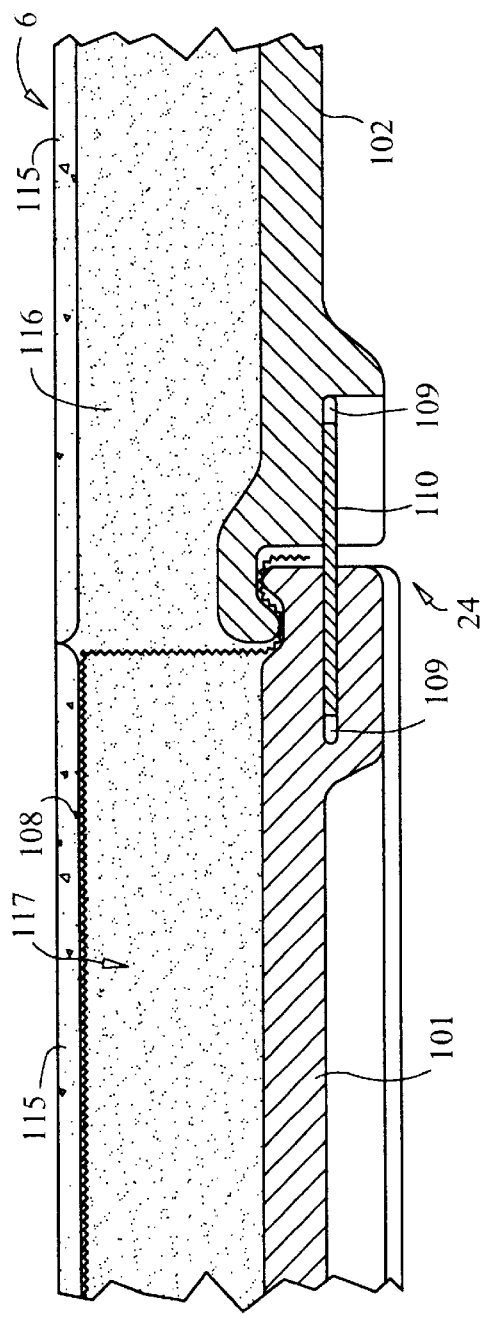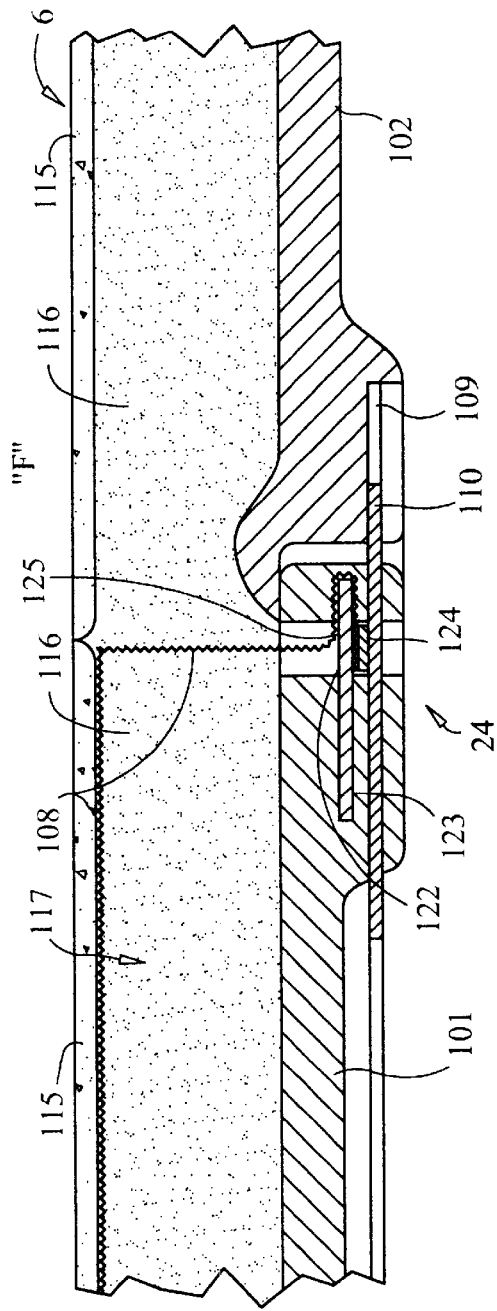

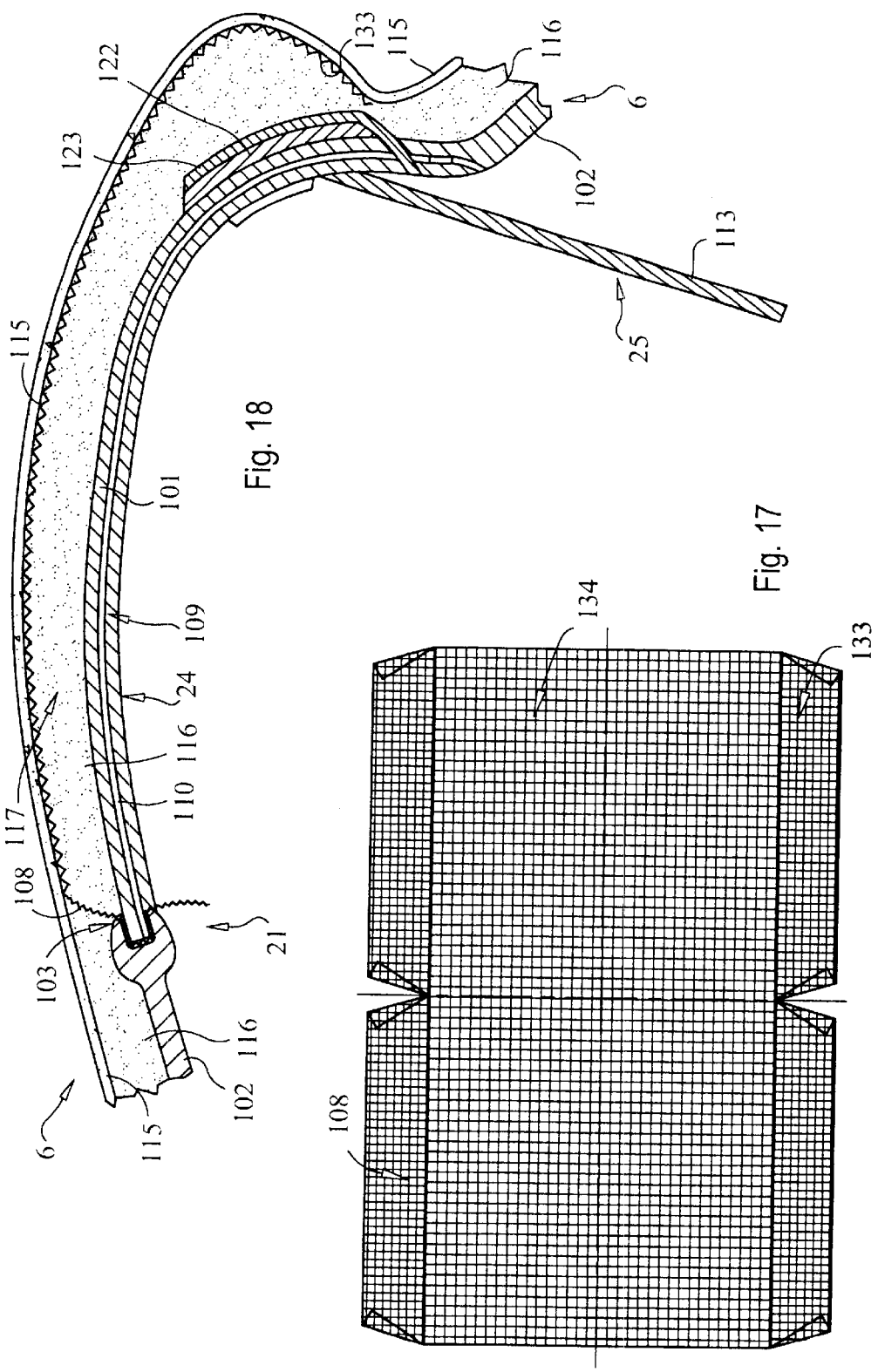

AIRBAG DEVICE AND OPERATING METHOD FOR IT AS WELL AS VEHICLE INTERIOR PANELING WITH IT

The invention relates in general to an airbag arrangement and an operating method for it and to a vehicle interior paneling.

The earlier German patent applications 197 12 782.7, 197 26 878.1 and 197 33 896.8, European patent application 98 10 55 51.0, international patent application PCT/DE 99/01564 and also utility model applications 298 08 317.5, 298 09 554.8, 298 19 165.2, 298 20 722.2, 299 05 000.9, 299 05 919.7, 299 07 102.2, 299 08 946.0, 299 10 059.6, 299 13 628.0 and 299 21 247.5 originating from the present inventor are concerned in general with an airbag arrangement and with a triggering method for it. The present invention relates to improvements in all of the techniques dealt with in the earlier application and to exemplary embodiments, in particular in respect of the construction of the airbag arrangement and triggering control, and specifically to a design for controlling an airbag flap which, in the normal state, closes an opening, for example in a dashboard, for the outlet of an airbag and directly before a triggered outlet of an airbag is pulled through the opening and behind the dashboard away from the occupant. To this extent, the complete content of disclosure of these earlier applications, in particular in respect of the construction of the airbag arrangement and triggering control, and specifically a refinement for controlling an airbag flap, is hereby incorporated by references to the full extent into the present document.

For example, the applications specified above disclose an airbag arrangement having an airbag flap which, prior to triggering of the airbag arrangement, is arranged in a closed position in an airbag outlet opening in a vehicle interior paneling, and which, as a consequence of triggering of the airbag arrangement, can be moved with respect to a vehicle occupant out of the airbag outlet opening into an open position behind the vehicle interior paneling by means of driving devices. The corresponding operating method for an airbag arrangement makes provision for the triggering of said airbag arrangement to cause an airbag flap to be moved with respect to a vehicle occupant from a closed position in an airbag outlet opening in a vehicle interior paneling into an open position behind the vehicle interior paneling by means of driving devices.

This technique is particularly advantageous because in this case the airbag flap does not, as is otherwise customary, have to be pressed open by the inflating pressure of the airbag itself which, as a result, has first of all to build up a large pressure and after it has pressed away the airbag flap is pushed forward with corresponding momentum toward the occupant to be protected. It is desirable if the airbag flap is held in a sufficiently stable and fixed manner in its closed position in order, when the airbag arrangement is not triggered, to absorb an impact of the occupant's head, for example.

The present invention therefore has the object of specifying an airbag arrangement, an operating method for it and a vehicle interior paneling containing it, so that an impact of an occupant's head against the vehicle interior paneling is reliably absorbed in the region of the airbag flap.

According to the invention, this object is achieved by an airbag arrangement as claimed in claim 1, a vehicle interior paneling as claimed in claim 26 and an operating method as claimed in claim 27. Preferred and advantageous developments of the particular aspect of the present invention are produced by the corresponding, dependent claims and combinations thereof.

The invention therefore provides an airbag arrangement having an airbag flap which, prior to triggering of the airbag arrangement, is arranged in a closed position in an airbag outlet opening in a vehicle interior paneling, and which, as a consequence of triggering of the airbag arrangement, can be moved with respect to a vehicle occupant out of the airbag outlet opening into an open position behind the airbag interior paneling by means of driving devices, wherein the airbag flap is held in its closed position in the airbag outlet opening in a form-fitting manner by means of engagement devices and locking devices, the engagement devices are assigned only to one side of the airbag flap and airbag outlet opening, and as a consequence of triggering of the airbag arrangement, the locking devices can be released by means of the driving devices, so that the airbag flap can be moved with respect to a vehicle occupant from its closed position in the airbag outlet opening into an open position behind the vehicle interior paneling.

The present invention involves designing an airbag flap which can be retracted from the module, in such a manner that in the case of said airbag flap the cover base is inserted into the dashboard support as a separate part, with the particular feature that, firstly, the flap is thereby absolutely stable in the event of an impact of a head and, secondly, in accordance with the form-fitting engagement can easily be unlocked, and therefore pulled back, by a movement of the pull cables which are connected.

The present invention advantageously achieves an absolutely fixed locking of the airbag flap in normal usage and, at the same time, a low-energy and therefore rapid movement of the flap into the interior of the dashboard if the airbag is triggered.

According to a preferred development of this airbag arrangement, it is furthermore provided that the engagement devices contain a plug-in groove and a plug-in strip which are arranged on and assigned to the airbag flap and the airbag outlet opening in such a manner that they can be moved apart transversely with respect to their direction of longitudinal extent during movement of the airbag flap from its closed position into an open position.

Alternatively or in addition, the locking devices can be assigned to at least one side of the airbag flap and/or airbag outlet opening. In this case, it is preferable for the locking devices to be assigned to a plurality of sides of the airbag flap and/or airbag outlet opening.

A further preferred refinement of the airbag arrangement consists in that the locking devices can be released transversely with respect to the opening movement of the airbag flap from its closed position into an open position. In this case, it is preferably provided that the locking devices contain at least one pair of teeth with one tooth assigned in each case to the airbag flap and the airbag outlet opening, and that in the closed position of the airbag flap the teeth of each pair of teeth can be shifted by means of the driving devices from a locking position, in which they oppose a movement of the airbag flap into its open position, into an unlocking position in which the movement of the airbag flap into its open position is released. In particular, a plurality of pairs of teeth is provided and/or that tooth of the at least one pair of teeth which is assigned to the airbag flap can be shifted from its locking position into its unlocking position.

Another development of the abovementioned variants consists in that all of the teeth which can be shifted between a locking position and an unlocking position are arranged on a common locking bar or on connected locking bars, wherein the locking bar is preferably a latching plate on which the tooth of the at least one pair of teeth is integrally formed. Alternatively or additionally, it can be provided that the teeth are designed in the manner of lugs or serrations, in which case the teeth are preferably designed as latching lugs or serrations. It is further preferred if the teeth face one another with rectangular or T-like surfaces.

In the invention it is furthermore preferred if the airbag flap is coupled via the locking devices to the driving devices for its movement from its closed position into an open position. Alternatively or additionally, the coupling of the airbag flap to the driving devices can be configured in such a manner that when said airbag flap is triggered first of all the locking devices are released and then the airbag flap is moved.

It is preferably further provided that the driving devices contain at least one pyrotechnic propellant and a mechanism which can be acted upon therewith. In this case, it is preferred if the mechanism contains at least one pull cable which can be acted upon by the pyrotechnic propellant and via the locking devices engages in the airbag flap in such a manner that, when the pyrotechnic propellant is triggered, first of all the locking devices are released and afterward the airbag flap is moved.

A further development which can advantageously be used of the airbag arrangement according to the invention consists in that it contains an airbag module which contains a gas generator which is used for generating gas for inflating an airbag and at the same time forms the driving source of the driving devices.

In the case of the airbag arrangement according to the invention, it can also advantageously be provided that the airbag flap contains an at least substantially stable flap base and a damping layer and an outer skin, and that the locking devices engage on the flap base. In this case, beyond the airbag flap the outer skin and preferably also the damping layer is/are (a) constituent part(s) of the remaining vehicle interior paneling, and/or the damping layer is a foam material layer. A further development of this overall variant of the airbag arrangement according to the invention consists in that a connecting fabric which is connected fixedly to the outer skin is included between the damping layer and the outer skin for connection of the driving devices. The last-mentioned refinement can advantageously be developed in that the connecting fabric runs through the damping layer at least approximately and/or substantially along the circumference of the airbag flap. Yet another development which is advantageously used consists in that the airbag flap and/or the airbag outlet opening are assigned cutting devices which are configured and/or arranged in such a manner that during a movement of the airbag flap from its closed position into an open position the damping layer is automatically weakened or severed, in which case the cutting devices are preferably also configured for weakening or severing the outer skin.

Further refinements also include the connection, in a manner suitable for production, of the interior paneling, for example a dashboard, to the airbag cover base by means of the connecting fabric. This is advantageous in order to prevent "the flight of chunks" out of the damping layer or foam material layer as said layer is torn through as a consequence of the airbag flap tearing out of the airbag outlet opening.

In the case of a vehicle interior paneling according to the invention, an airbag arrangement as claimed in one of the preceding claims is included.

An operating method according to the invention for an airbag arrangement whose triggering causes an airbag flap to be moved with respect to a vehicle occupant from a closed position in an airbag outlet opening in a vehicle interior paneling into an open position behind the vehicle interior paneling by means of driving devices is characterized in that prior to a movement of the airbag flap from its closed position into an open position driving devices release locking devices which hold the airbag flap until then in a form-fitting manner in the airbag outlet opening, and in that in the course of the movement of the airbag flap from its closed position into an open position engagement devices, which hold the airbag flap in its closed position in a form-fitting manner in the airbag outlet opening, are automatically disengaged.

The same advantages and benefits as in the configuration of the invention embodied as an apparatus are therefore achieved.

A preferred development of the method consists in that the release of the locking devices takes place transversely with respect to the opening movement of the airbag flap from its closed position into an open position. Alternatively or additionally, it can be provided that one tooth of at least one pair of teeth is shifted from an at least partially overlapping locking position into an unlocking position in which the movement of the airbag flap into its open position is released.

Furthermore, in each variant of the method, after release of the locking devices the driving devices can automatically engage on the airbag flap and move the latter from its closed position into an open position.

Another preferred refinement of the method consists in that an airbag is inflated with gas from a gas generator and emerges from the vehicle interior paneling through the airbag outlet opening toward the vehicle occupant after the airbag flap has reached an open position. In this case, it is preferred if the release of the locking devices and/or the opening of the airbag flap is/are driven by means of the gas generator.

Furthermore, it can advantageously be provided that prior to or during the opening of the airbag flap a damping layer and/or an outer skin of the airbag flap and of the remaining vehicle interior paneling is/are weakened or severed at least approximately and/or substantially along the circumference of said airbag flap by means of cutting devices.

With the present invention, the aim is therefore achieved in every refinement of making further improvements in an airbag arrangement, a vehicle interior paneling containing it and an operating method for it, in particular in accordance with the earlier applications mentioned at the beginning. In particular, the present invention can be used as an addition to the varied patent applications mentioned at the beginning by the same applicant, and furthermore can contribute to a reduction in the aggressiveness of the bag in that a mechanism pulls the airbag covering into the dashboard, for example.

By means of the present invention and its diverse developments, numerous advantages can specifically be achieved, some of which are mentioned below by way of example:

Satisfactory connection of the interior paneling or dashboard outer skin or film by means of the connecting fabric to the flap or cover base, as a result of which loose particles and a separation of foam and airbag cover base are avoided.

Simple installation of the fabric connection and flap or cover.

Small force for retracting the flap or cover, since the flap or cover base does not to be broken out.

The airbag cover or flap base can be arranged behind a support of the interior paneling, for example the dashboard support, which means that the cover cannot emerge out of the surface of the dashboard.

Further technical particular features are specified by way of example below within the context of individual exemplary embodiments:

The airbag cover or the airbag flap can preferably be designed in such a manner that its skin, foam and base is connected by fabric (the connecting fabric) to an unseparable part. This has the effect in particular that despite the airbag flap tearing out of the interior paneling, for example a dashboard, particles do not become detached from the airbag flap.

The course of the fabric of the connecting fabric can be used as a foam separation from the film of the outer skin to the flap base. As a result, a mechanical foam separation and an airbag flap or cover base separation as a separate part can become unnecessary.

In a further particular embodiment, the connecting fabric is wedged in on one side between a tongue and groove configuration between the interior paneling or, for example, the dashboard support, and the flap base.

The connecting fabric can also be clamped into a slot in the airbag flap base by means of a wedged strip. A stable position in the normal position can be achieved by latching lugs. The latching lugs can also be unlatched in a simple manner when subjected to tension. The latching lugs can furthermore be designed in such a manner that they also simultaneously unlatch on three sides counter to tension.

The connecting fabric can be connected as a film/base composite in a simple manner which is suitable for production. The flap or the cover may possibly be recessed or fitted in without air or clearance for foam tightness purposes in the "monkey technique".

The pull cables, as component parts of the mechanism of the driving devices, can be connected directly to the locking devices, for example a latching plate, of the flap or cover base in a position pointing in the same direction. The cables then first of all unlock the locking devices and then pull the airbag flap behind the interior paneling, for example into a module.

The outer skin of the interior paneling, for example a dashboard skin, the flap or cover base and the enclosing of the foam can be joined as an indestructible unit.

A lateral foam separation can be formed, alternatively by means of fabric separation or by means of integrally formed cutting blades. Alternatively, the connecting fabric may be coated for better foam separation.

At an angled connection of the pull cables of the mechanism of the driving devices, the unlocking of the latching lugs or teeth can be carried out by means of a gearwheel pivotable by the cable, and the latching plate can be designed at least partially as a rack. Alternatively, the unlocking of the latching lugs can be carried out by movement of the latching plate by means of the "pull cable".

The connecting fabric can be divided into two halves in order thereby to obtain a better binding coating. (Flame protection is unnecessary at a visible length of smaller than 100 mm.)

The latching plate of the locking devices can be flexible in such a manner that it can carry out a small movement to the required extent of, for example, about 5 mm, on curved paths.

The airbag cover or flap base can be formed from two preferably clinched metal plates and can be used at the same time as a support of the cover/flap, for connecting the fabric (connecting fabric), for the mounting of the clamping mechanism of the connecting fabric and for the connection of the cables. In addition, all of the latching lugs or teeth or the like can be attached to these plates.

The airbag flap base can be designed as a foam-separating means in the region of the latching lugs or teeth in such a manner that the movement function for unlatching purposes is retained.

Further preferred and/or advantageous refinements of the invention emerge from all of the present documents and in combination with the disclosure contents of the earlier applications mentioned at the beginning.

The invention is explained in greater detail below using exemplary embodiments and by reference to the drawing.

FIG. 2 shows schematically the locking devices of the airbag arrangement according to FIG. 1 in a partial, horizontal section.

FIG. 3 shows the airbag flap of the airbag arrangement according to FIG. 1 schematically in a plan view.

FIG. 7 shows schematically the section "A" in FIG. 6.

FIG. 8 shows schematically an illustration analogous to the section "A" in FIG. 6 in a design having two airbag flaps.

FIG. 9 shows schematically the section "B" in FIG. 6.

FIG. 10 shows schematically the section "D" in FIG. 6.

FIG. 11 shows schematically an alternative analogous to the section in "B" in FIG. 6.

FIG. 12 shows schematically the section "F" in FIG. 16.

FIG. 17 shows schematically a connecting fabric.

FIG. 18 shows schematically a section of an airbag flap of a third exemplary embodiment of an airbag arrangement and vehicle interior paneling.

Figure 1:
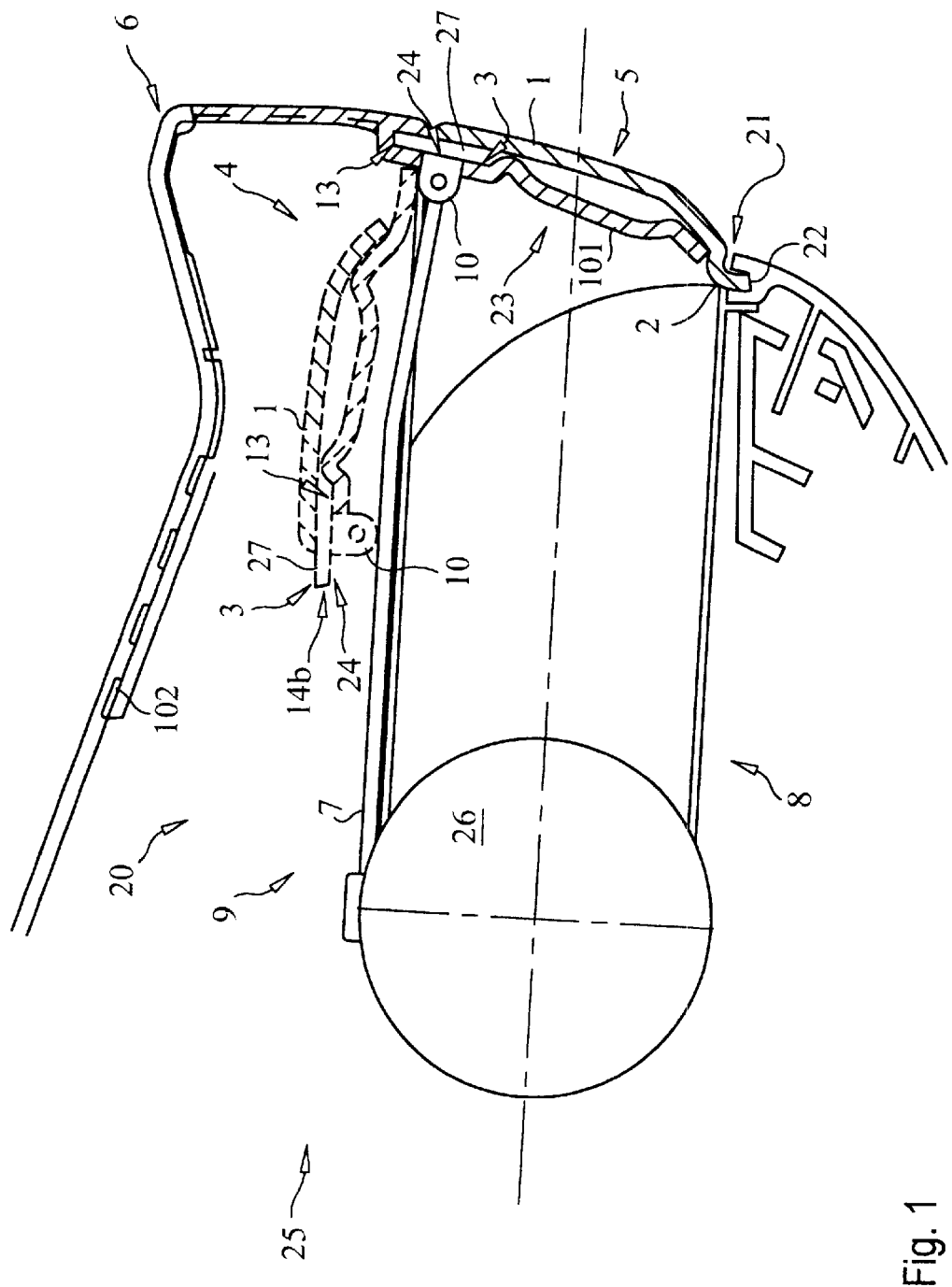
FIG. 1 shows schematically and partially the cross section of a first exemplary embodiment of an airbag arrangement in a vehicle interior paneling in the form of a dashboard.

Identical reference numerals in the individual figures and images of the drawings denote identical or similar or identically or similarly acting components. Those features which are not provided with reference symbols also become clear with reference to the illustrations in the drawing, irrespective of whether such features are described below or not. On the other hand, features which are contained in the present description, but are not visible or illustrated in the drawing are also readily comprehensible for an expert.

FIG. 1 shows schematically, in a sectional view, an airbag arrangement 20 and a vehicle interior paneling 6 in the form of a dashboard which is equipped therewith. Further details of this first exemplary embodiment are shown in FIGS. 2 to 5.

An arrangement of an airbag module 8 in the dashboard 6 can be seen in FIG. 1. An airbag flap 1 is mounted at the bottom in a plug-in strip 2 with engagement devices 21 being formed, and is held at the top in a closed position or rest position 5 by a locking arrangement 3 in a built-in position. The plug-in strip 2 on the edge of the airbag flap 1 is held in a plug-in groove 22 on the correspondingly opposite edge of an airbag outlet opening 23 in the dashboard 6 when the airbag flap 1 is in its closed position 5. The plug-in strip 2 and the plug-in groove 22 form engagement devices 21 between the airbag flap 1 and the airbag outlet opening 23 or the dashboard 6 surrounding the latter. The locking arrangement 3 forms locking devices 24.

By means of a pull cable 7, which is a component part of driving devices 25, the locking arrangement 3 is unlocked when the airbag arrangement 20 is triggered, with the result that the airbag flap 1 can then be pulled into an open position 4. The airbag flap 1 then releases the airbag outlet opening 23 through which an airbag (not shown) of the airbag arrangement 20 can emerge through the vehicle interior paneling 6 toward an occupant (not shown). Both the closed position 5 and the open position 4 of the airbag flap 1 are shown in FIG. 1 in continuous lines, the pull cable 7 and its connection to the airbag flap 1 being omitted in the illustration of the airbag flap 1 in its open position 4 for reasons of clarity.

The drive of the pull cables 7, which engage at both ends on the airbag flap 1, takes place via a retracting mechanism or general mechanism 9 and a gas generator 26 acting upon the latter when the airbag arrangement 20 is triggered. The mechanism 9 and the gas generator 26 are likewise a constituent part of the driving devices 25. The gas generator 26 is furthermore a constituent part of the airbag module 8 and is ultimately used also for supplying gas for filling an airbag (not shown) as a consequence of the airbag arrangement 20 being triggered. A piston (not shown) which is acted upon by gas originating from the gas generator may, for example, be used as a movement source for the mechanism 9, by being coupled to the mechanism 9.

The driving devices 25, their components and controlling means are illustrated extensively and in variants in the earlier applications mentioned at the beginning, and so the contents of disclosure in this regard are incorporated to the full extent into the present documents by reference hereby undertaken so as to avoid mere quotations.

FIG. 2 shows the locking arrangement 3 in a partial, horizontal section at the height of the locking arrangement 3 through approximately half of the airbag module 8. The rest, which cannot be seen, in the form of approximately the other half can be added in a mirror-symmetrical manner. The pull cables 7 each engage on a bent portion 10 of the locking arrangement 3, at which the pull cables 7 are led through and in each case fastened by a cable grommet 11. A transverse locking arrangement 12 and the segmental, upper locking arrangement 13 can be seen, which arrangements are both constituent parts of the locking devices 24, and so the at least approximately rectangular airbag flap 1 is held on three of its sides by an active locking arrangement and on the fourth side by the engagement devices 21 in each case in a form-fitting manner in the airbag outlet opening 25 in the dashboard 6.

FIG. 3 shows the plan view of the airbag flap 1, built into the dashboard 6 together with the locking arrangements 3 in the form of the transverse locking arrangements on both sides and the segmental, upper locking arrangement 13. The upper locking arrangement 13 contains positionally fixed segments, lugs or teeth 14a on or along the corresponding side of the airbag outlet opening 23. The upper locking arrangement 13 contains segments, lugs or teeth 14b on the airbag flap 1. The teeth 14b are fitted or formed on a common locking bar 27 which can be shifted with respect to the airbag flap 1.

One tooth 14a and one tooth 14b in each case form a pair of teeth 14 whose teeth, for the purpose of locking the airbag flap 1 in the airbag outlet opening 25, at least partially overlap, forming a positive engagement, in that they lie one behind another counter to the direction of movement of the airbag flap 1 during its retracting movement. The locking bar 27 can be shifted on the airbag flap 1 and with respect to the dashboard support or in general the vehicle interior paneling 6 in such a manner that the teeth 14b can be shifted from their overlapping position with the teeth 14a into intermediate spaces 14c between the teeth 14a. In such a position of the teeth 14b, the teeth 14a are aligned with intermediate spaces 14d between the teeth 14b. The teeth 14b can therefore go past the teeth 14a through the corresponding intermediate spaces 14c, since the locking devices 23 are released to this extent. The teeth 14b on the locking bar 27 on the airbag flap 1 thus pass in a comb-like manner between the shifted teeth 14a on the airbag outlet opening 23.

In the exemplary embodiment given, the teeth 14b are more precisely distributed on two locking bars 27, on which a respective pull cable 7 engages and which can be pulled toward each other via it by the driving devices 25 as a whole in order to release the locking devices 24.

In each case one of the transverse locking arrangements 12 on both sides is formed by a tooth or a lug 12a and is formed or fitted on one of the locking bars 27 in such a manner that it can be in form-fitting engagement with one of the edge sides of the airbag outlet opening 23, which edge sides, presupposing a rectangular airbag flap 1 and corresponding airbag outlet opening 23, as in the present exemplary embodiment, lie between the side having the plug-in groove 22 and the side having teeth 14a. This engagement, like the formfitting overlapping of the teeth 14b behind the teeth 14a, exists in the closed position of the airbag flap 1 within the airbag outlet opening 23 in the dashboard or in general vehicle interior paneling 6. By pulling together the locking bars 27, as has been described above, not only are the teeth 14b pulled into the intermediate spaces 14c between the teeth 14a, which are thereby aligned with the intermediate spaces 14d, but the lugs 12a are also pulled back, with the result that the form-fitting engagement with the dashboard 6 at the edge of the airbag outlet opening 23 is released. In this state of the locking devices 24, the airbag flap 1 can now be moved from its closed position 5 into an open position 4. In the present exemplary embodiment, this takes place in a simple manner by further pulling on the pull cables 7 which are correspondingly connected for this purpose to the airbag flap 1.

Figure 4:
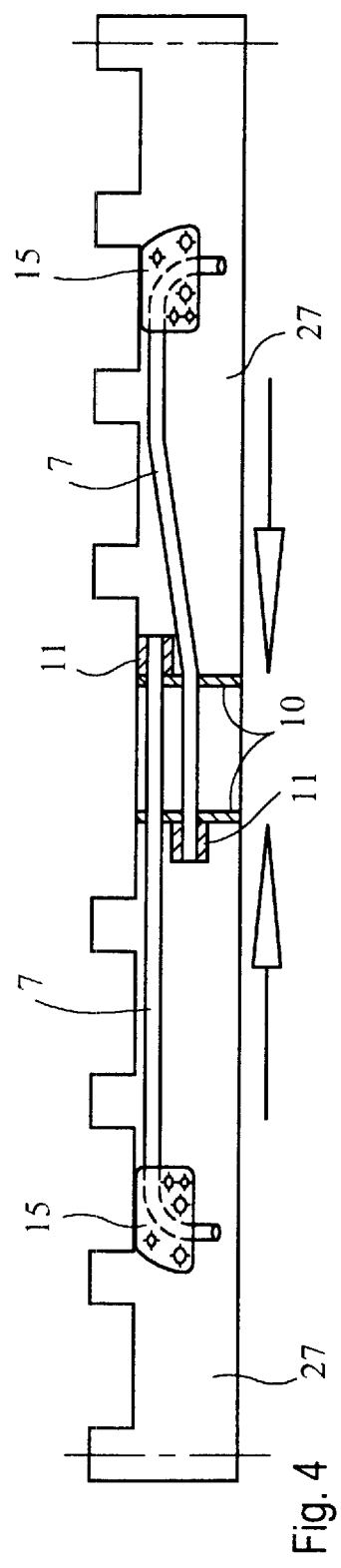
FIG. 4 shows schematically the locking devices of the airbag arrangement according to FIG. 1 with two locking arrangements in a position assembled together with pull cables.
Figure 5:
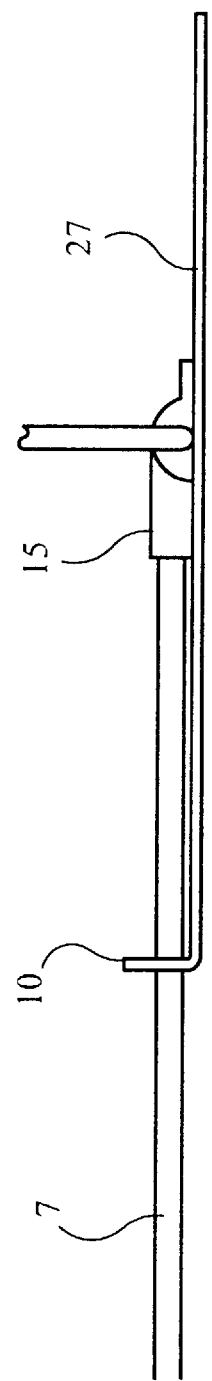
FIG. 5 shows schematically a detail of the assembly of locking devices and driving devices in the case of the airbag arrangement according to FIG. 1, half in a 90° view with regard to FIG. 4.

FIG. 4 shows, as individual parts, the two locking bars 27 of the upper locking arrangements 13 of the locking arrangements 3 in a position assembled together with the pull cables 7, including a respective cable deflecting device 15. FIG. 5 shows half the assembly in a 90° view.

The functioning of the invention is explained below. The initial situation is such that the airbag flap 1 is mounted on one side by a plug-in strip 2 in a plug-in groove 22 and on the remaining sides is secured in position by pushed-forward or locked locking devices 24 for normal usage and in an advantageous manner against an impact of an occupant's head (not shown). The teeth 14b on the locking bars 27, which belong to the locking arrangement 3 and are arranged in a shiftable manner on the airbag flap 1, are, as viewed from the occupant, in front of teeth 14a in position and therefore in form-fitting engagement against a movement of the corresponding side of the airbag flap 1 away from the occupant. The lugs 12a on the locking bars 27 are in direct engagement with adjacent edges of the airbag outlet opening 25.

The airbag flap 1 is thus secured in position and is sufficiently stable in its closed position 5 against an impact of an occupant's head. If the airbag (not shown) is now triggered, the pull cables 7 then pull back the locking arrangement 3 with its teeth 14b between the teeth 14a and the lugs 12a out of engagement with the edge of the airbag outlet opening 25. The locking devices 24 are therefore released and the airbag flap 1 is thus unlocked and can be pulled into the interior of the dashboard 6 by further movement of the pull cables 7. Of course, the illustration concerns just one exemplary embodiment. Further types of the active locking arrangement, which makes up the core of the present invention, are conceivable.

Figure 6:
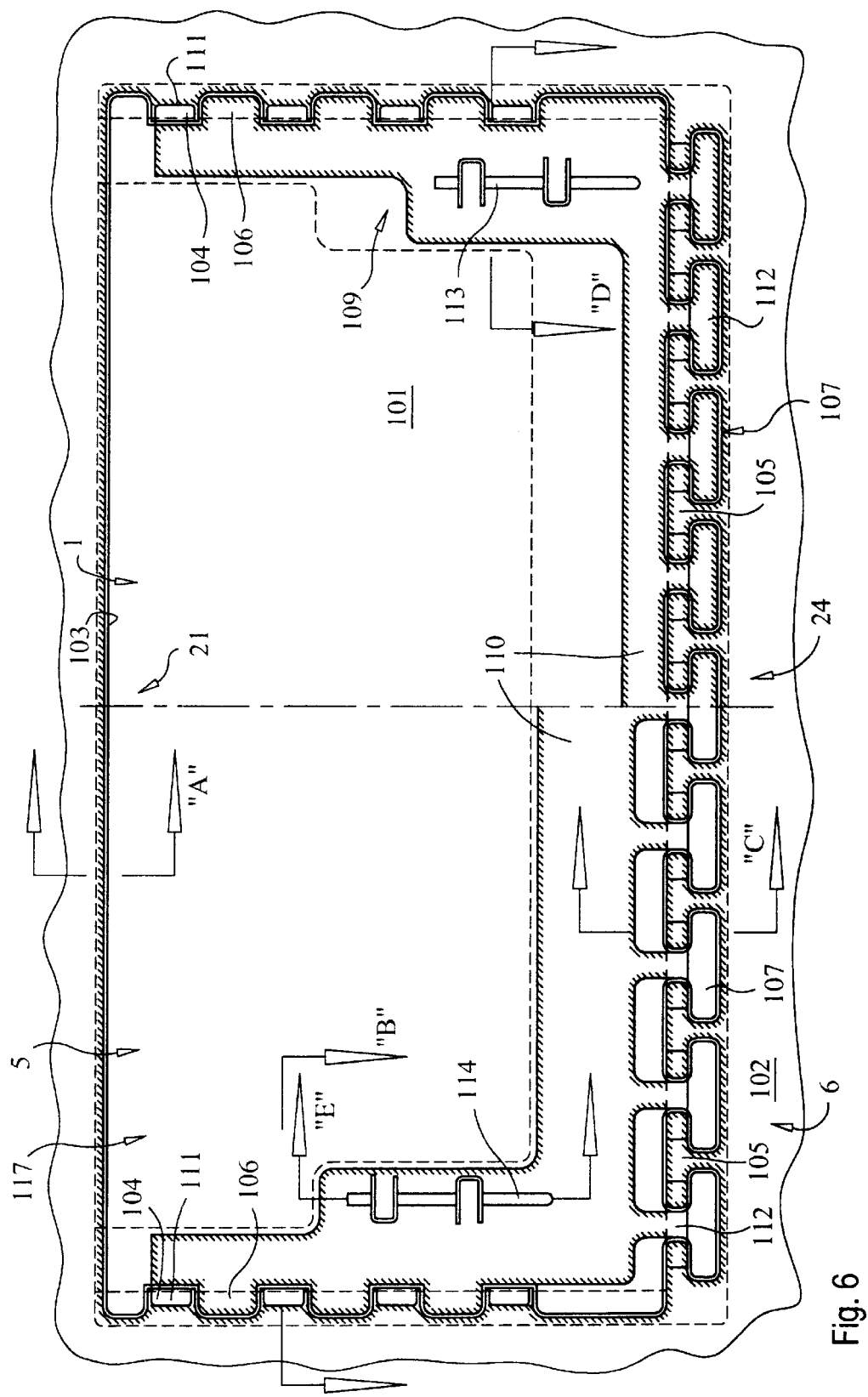
FIG. 6 shows schematically an airbag flap base of a second exemplary embodiment of an airbag arrangement and vehicle interior paneling in a plan view.

FIG. 6 shows a second exemplary embodiment of an airbag arrangement 20. Parallels with the above-described, first exemplary embodiment according to FIGS. 1 to 5 can readily be seen by viewing the respective illustrations and also identical or similar terminology and will not be described separately and in detail below as long as they are readily comprehensible so as to avoid repetitions. This also applies to third and further exemplary embodiments described further on.

The airbag flap 117 and also a further airbag flap 118 which can be provided in a variant of this second exemplary embodiment in each case contain an airbag cover base 101 fitted from the lower side into a dashboard support 102 generally of a vehicle interior paneling 6. The airbag cover or flap base 101 is plugged on one side into a groove 103 in the dashboard support 102. The dashboard support 102 is provided with rectangular latching lugs 104 on the short sides of the elongated rectangular airbag outlet opening 23. On the remaining, long side of the airbag outlet opening 23, the dashboard support 102 is provided with T-shaped latching lugs 105. Other shapes of the latching lugs 104 and 105 are also possible.

The airbag cover base 101 is fitted in a form-fitting manner into these latching lugs 104 and 105 by means of latching lugs 106 and 107 matched to them, in order to prevent foam from passing through during the production of the dashboard 6 when a foam material is jointly applied to the airbag cover base 101 in the airbag outlet opening 23 of the dashboard support 102 and to the latter itself in each case on the side which subsequently faces an occupant. An injection of the cover by means of the "monkey technique" is an alternative to ensure optimum tightness.

The "monkey technique" means: the body is cast with a thermoplastic which is liquid at a relatively high temperature. The arm connection is recessed. The arms are cast onto this "body" into the arm connections (in the present case: latching lugs) with a thermoplastic which is liquid at a relatively low temperature. The arms are then cast in a precisely fitting manner into the round connections and can be moved again. This technique would produce an absolutely precisely fitting airbag cover base which is shown for the fitting of a fabric connection in FIG. 7 onward.

A latching plate 110 analogous to the locking bars 27 in the first exemplary embodiment is fitted in a fitting groove 109 encircling the airbag cover base 101 on three sides. FIG. 6 shows, in the right-hand half of the illustration, how the latching plate 110 with fitting latching lugs 111 and 112 can be displaced congruently with the latching lugs 106 and 107; the airbag cover base 101 could be moved out of the airbag outlet opening 23. FIG. 6 furthermore shows, in the left-hand half of the illustration, how the latching plate 110 is adjusted in such a manner that its latching lugs 111 and 112 come to lie on the latching lugs 106 and 107 in such a manner that the airbag cover base 101 is secured in position in the dashboard support 102.

Pull cables 113 and 114 analogous to the pull cables 7 in the first exemplary embodiment are connected to the latching plate 110 and are therefore a constituent part of the driving devices 25. When the airbag arrangement 20 (not shown) is triggered, the latching plate 110 is pulled by means of the pull cables 113 and 114 into the unlocking position (left-hand half of FIG. 6) and the airbag flap 1 is pulled, as seen from the occupant, behind the vehicle interior paneling or the dashboard 6.

FIG. 7 shows schematically the section "A" in FIG. 6. An outer skin, or specifically dashboard skin 115, having a fabric connection 108 assembled together with foam material 116, the dashboard support 102 and the airbag cover base 101 is shown. The picture shows how the airbag cover base 101 is plugged into the groove 103 of the dashboard support by the fabric connection 108 being fixedly inserted at the same time. The fabric connection or the connecting fabric 108 therefore covers the foam 116 which, as a result, cannot become separated when the airbag flap 117 is torn off.

FIG. 8 shows, analogously to the arrangement shown in the section "A" of FIG. 7, a fabric connection 108 in the case of two airbag flaps 117 and 118. The foam 116 of both airbag flaps 117 and 118 is therefore protected against "separating".

FIG. 9 shows schematically the section "B" in FIG. 6. The airbag cover base 101 and the dashboard support 102 are connected to each other or uncoupled from each other by means of the latching plate 110 running in the fitting groove 109 in the airbag cover base 101, in each case depending on the position of the latching plate 110 and its latching lugs 111/112 with regard to the latching lugs 104/105 and 106/107 on the dashboard support 102 and airbag cover base 101. Integrally formed at the end of the dashboard support 102, in the side profile of the airbag flap 117 or 118, is a cutting edge or in general cutting devices 120 in order to neatly separate the foam material 116.

FIG. 10 shows schematically the section "D" in FIG. 6 together with the connection of the pull cables 113 and 114 to the latching plate 110. Everything else is identical to FIG. 9.

FIG. 11 shows an alternative in the plane of the section "B" (FIG. 6) to the variant according to FIG. 9 with a fabric tab or connecting fabric 121 for separating the foam material layer 116, as a result of which the cutting edge or the cutting devices 120 can be omitted.

Figure 16:
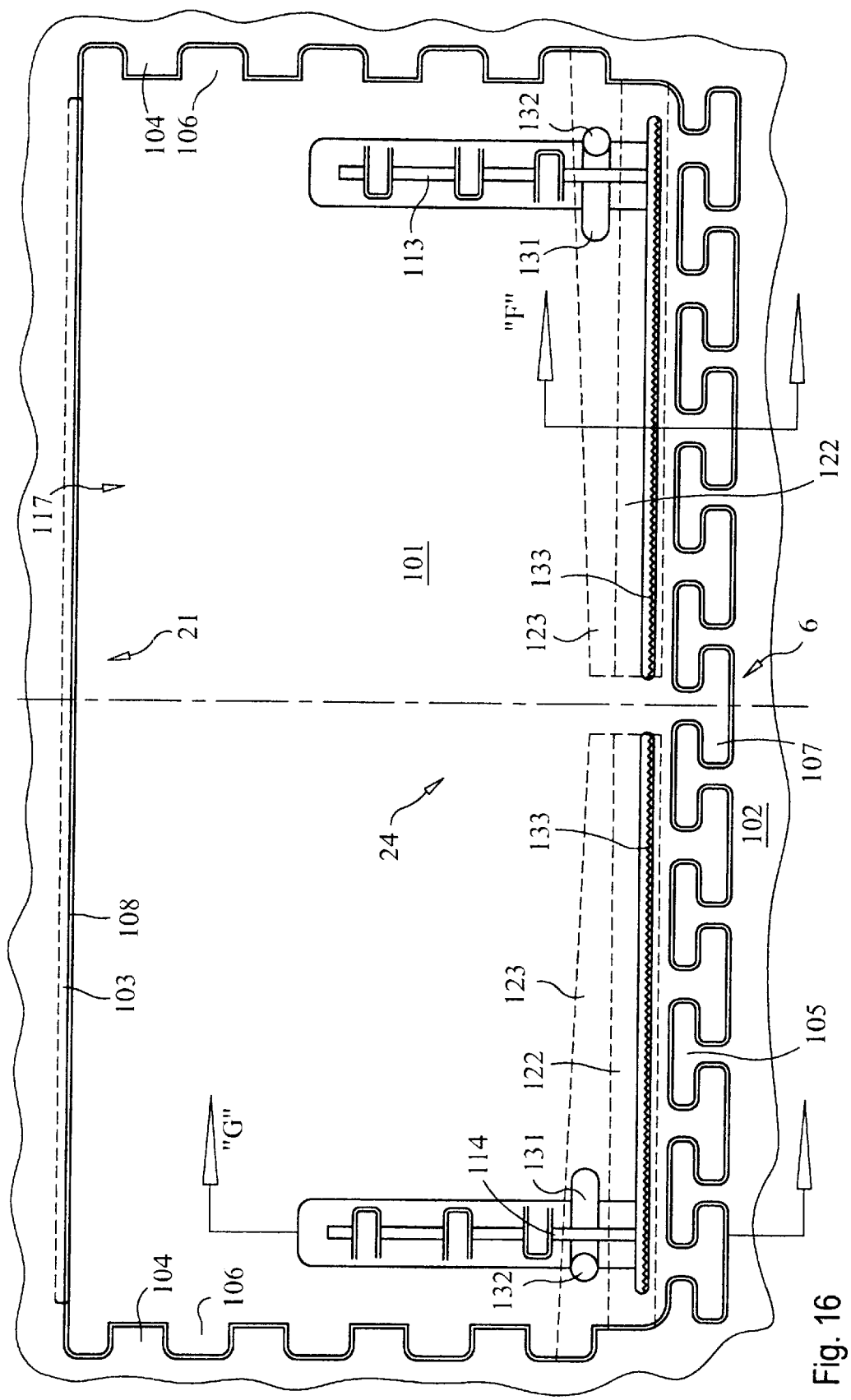
FIG. 16 shows schematically, as an addition to FIG. 6, the functional diagram of a fabric connection for the airbag flap to the driving devices.

FIG. 12 shows schematically the section "F" in FIG. 16. Above the connection of the dashboard support 102 and airbag cover base 110 by means of the latching plate 110, virtually in a plane lying further upward, the fabric connection or the connecting fabric 133 is wedged in by means of a strip 122, alternatively also as a strip having "serrations"

(not shown), in which the fabric connection is form-fitting. The strip 122 is secured by a wedge-shaped part 28. An inserted strip 124 ensures that a fabric tab 125 of the connecting fabric 133 does not enter into the fitting groove 109.

Figure 13:
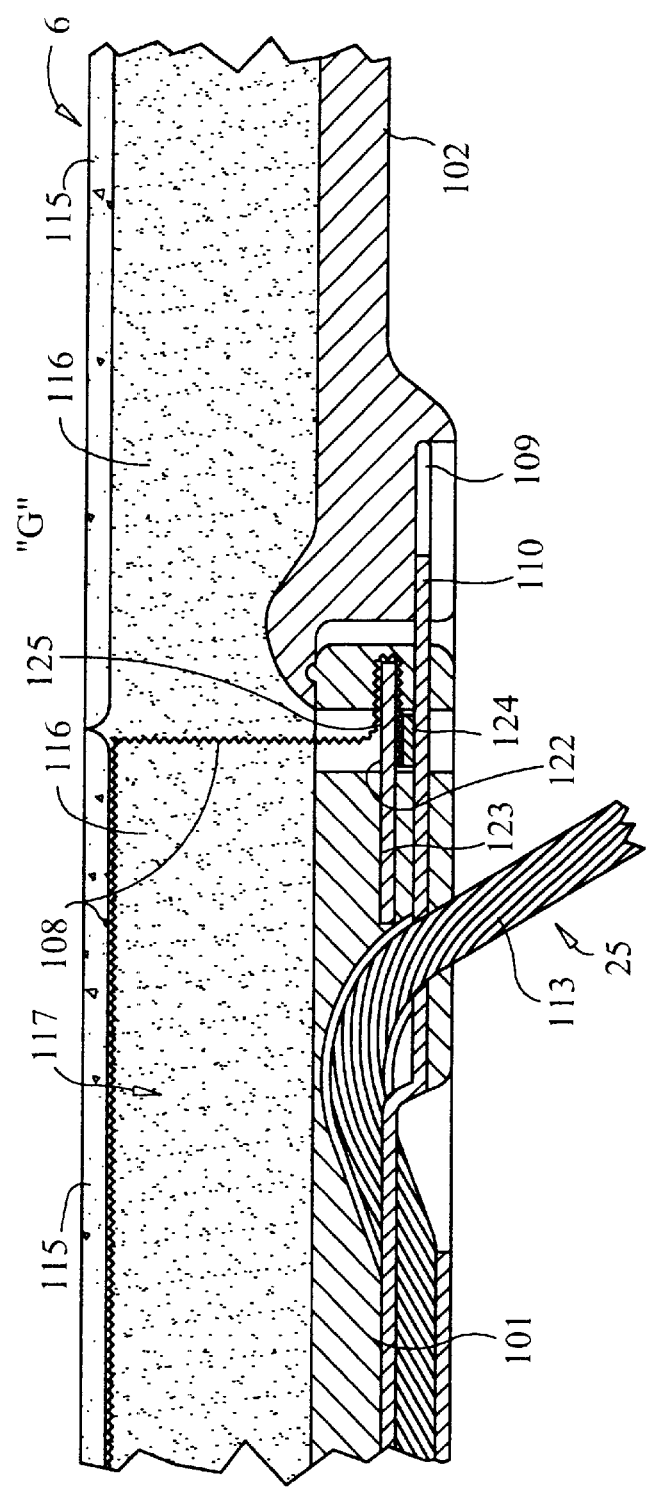
FIG. 13 shows schematically the section "G" in FIG. 16.

FIG. 13 shows schematically in the section "G" from FIG. 16 the same details as FIG. 12, but also the connection of the pull cables 113 and 114 on the latching plate 110.

Figure 14:
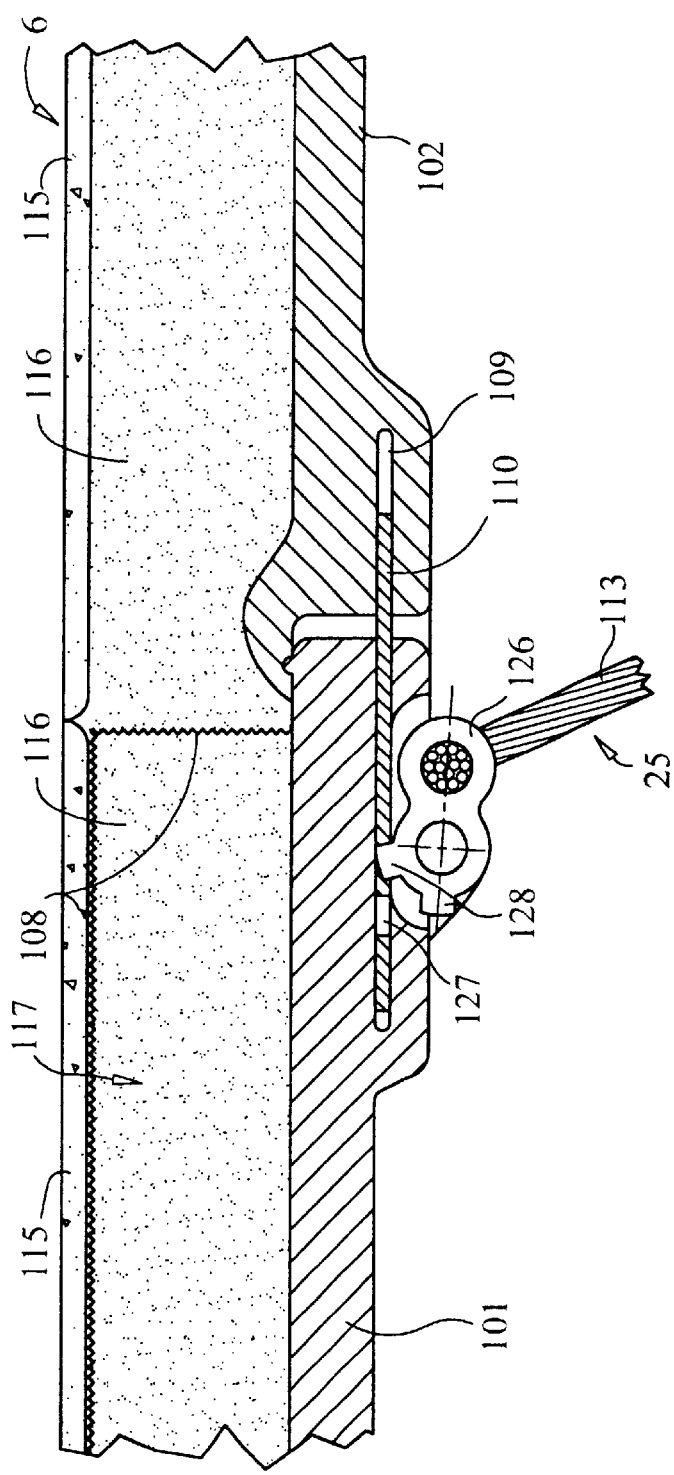
FIG. 14 shows in a schematic view analogous to the section "G" in FIG. 16 details of a variant.

FIG. 14 shows analogously to the section "G" from FIG. 16 a variant of the connection of the pull cables 113 and 114 as an alternative by means of pivotable plates 126 which, when the cable is pulled, by means of teeth 128 which are plugged into corresponding holes 127 in the latching plate 110 and displace and therefore unlatch the latching plate 110.

Figure 15:
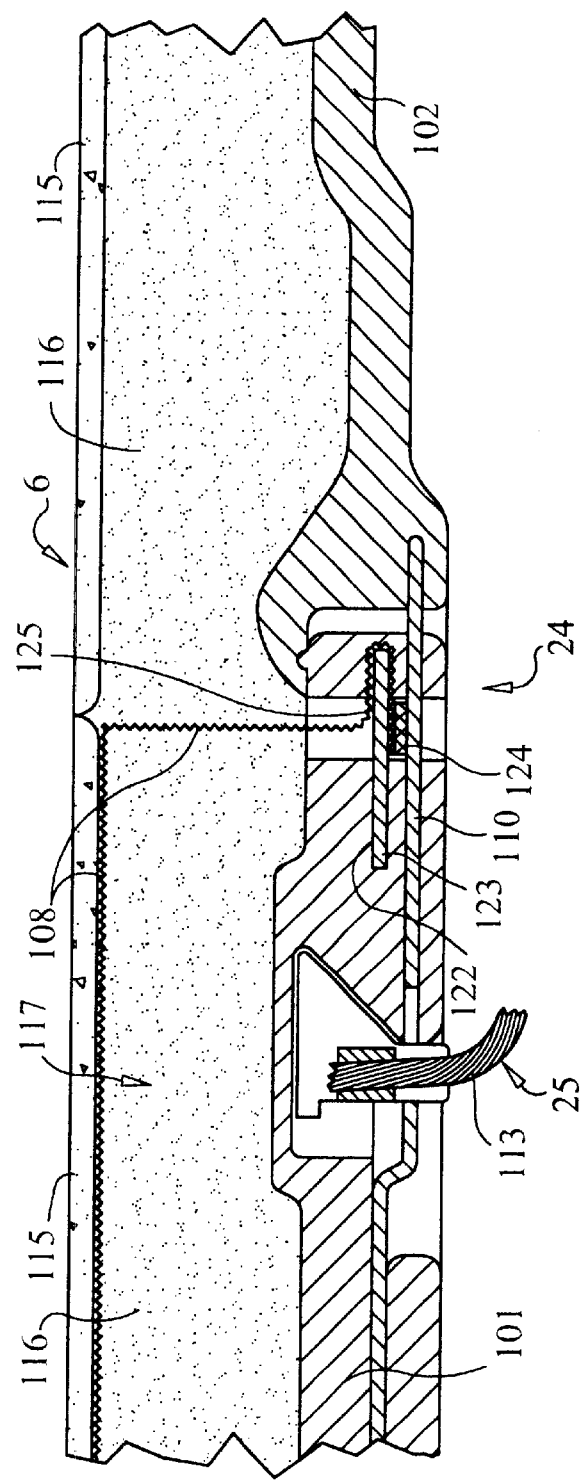
FIG. 15 shows in a schematic view analogous to the section "G" in FIG. 16 details of a further variant.

FIG. 15 shows analogously to the section "G" from FIG. 16 as an alternative to FIG. 14 the connection of the pull cables 113 and 114 in a respective wedge-shaped pull cam 129 which, when pulled, by means of its downward movement inevitably pulls the latching plate 110 out of the fitting groove 109. Further, similar, technically conventional alternatives are conceivable.

FIG. 16 shows, as an addition to FIG. 6, the functional diagram of the fabric connection or of the connecting fabric 133 in the groove 103 and on the opposite side in slot 130, as illustrated in the sectional illustrations of FIGS. 12 to 15. On the opposite side, the connecting fabric 133 is plugged here into two slots and locked by means of the invisible (dashed-line) strips 122 and wedge-shaped parts 123. In order to move the wedge-shaped parts 123, further slots 131 and, for example, a hole 132 in the wedge-shaped part are required.

FIG. 17 shows the connecting fabric 134 which is connected in the central region to the dashboard skin 115 (corresponding to the earlier applications mentioned at the beginning), and the fabric connections or connecting fabric 108 and 133. The fabric connection or connecting fabric 108 and 133 is/are divided in order to give better handling and in order to come below a length of 100 mm. This is advantageous in order to be able to coat the fabric with readily adhering, fluid PVC, since the latter has a substantially better adhesion to the dashboard skin 115.

The fabric connection or connecting fabric 108 and 133 divides/divide the foam material 116 in the dashboard 6. Should the normally fitted connecting fabric 134 result in insufficient separation of the foam material layer 116 (flight of chunks), the connecting fabric 134 toward the foam material 116 of the dashboard 6 (not shown) can be equipped or selected such that it is antiadhering with regard to the foam material 116. This technique saves on the notching of the foam material layer 116 and, with a separate airbag cover base 101, on the notching thereof.

FIG. 18 shows a further exemplary embodiment with reference to a schematic section of an airbag flap 117. The fabric connection or the connecting fabric 108 is wedged in the groove 103. The latching plate 110 is guided in a bent fitting groove 109. The latching plate 110 is thin and sufficiently flexible that it can be displaced over a distance of approximately 5 mm for release purposes. The pull cables 113/114 are fastened to the latching plate 110. This simple fastening is advantageous in this case, since the pull cables 113/114 and the latching plate 110 lie virtually in one plane. The fabric connection or the connecting fabric 133 is carried out in a second plane together with the strip 122 and the wedge-shaped part 123, as is illustrated in FIG. 6, which to this extent can be regarded as a system picture.

Figure 19:
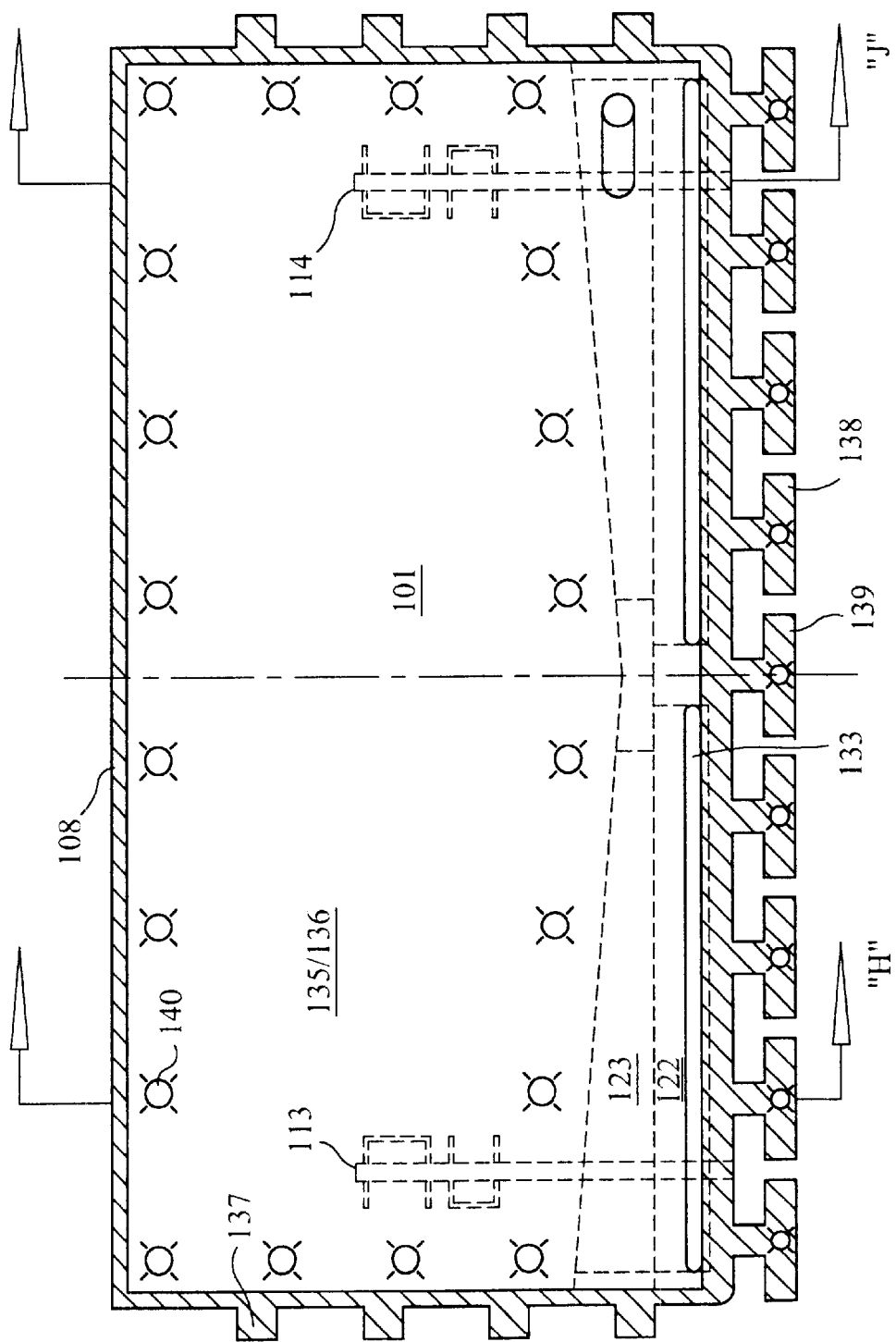
FIG. 19 shows schematically a simplified design of an airbag flap base of a fourth exemplary embodiment of an airbag arrangement and vehicle interior paneling.
Figure 21:
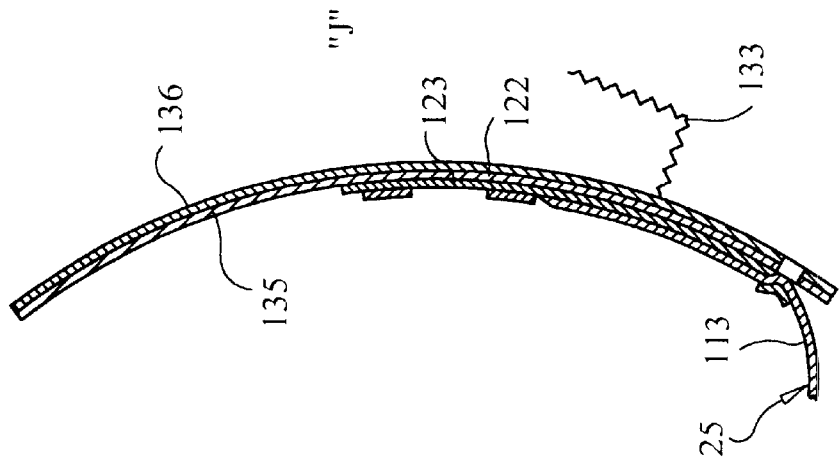
FIG. 21 shows schematically the section "J" in FIG. 19.

FIGS. 19 and 21 show schematically a simplified design of the technique described previously. The airbag cover base 101 merely comprises two plates 135 and 136 which have been clinched together, contain the fabric connection or the connecting fabric 108 and 133, latch the system into place and are used at the same time as the airbag cover or flap base 101.

In order to avoid the foam 104 penetrating more easily into the latching lugs 137 and 138 and making the movement of the latter more difficult, the plates 135 and 136 are not coated in a foam-adhering manner in the hatched region 139 of FIG. 15. It is furthermore presupposed that the approximately 10000 N tensile force of the airbag flap retracting mechanism (not shown) can push away the foam between the latching lugs 137 and 138.

FIG. 19 furthermore shows the clinching 140 and the accommodation of the strip 122 of the fabric connection or of the connecting fabric 133 and of the wedge-shaped part 123 between the plates 135 and 136. The pull cables 113 and 114 are also connected to these plates 135 and 136, as is shown.

Figure 20:
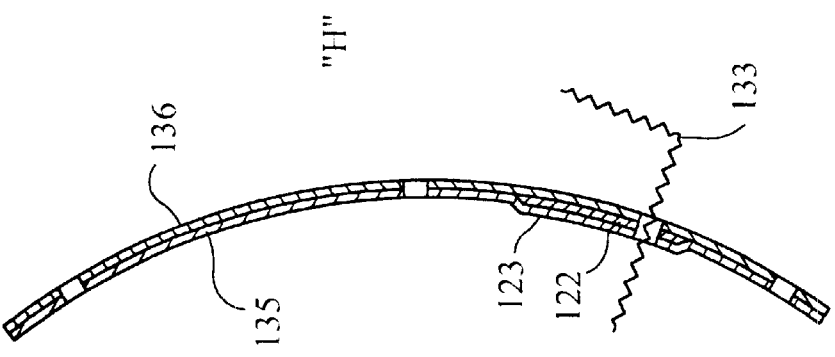
FIG. 20 shows schematically the section "H" in FIG. 19.

FIG. 20 shows schematically a section "H" in FIG. 19 through the plates 135 and 136 and the fabric connection or the connecting fabric 133 together with the strip 122 and the wedge-shaped part 123.

FIG. 21 shows in the section "J" in FIG. 19 the connection of the pull cables 113 and 114 and the strip 122 lying between the plates 135 and 136 and the wedge-shaped part 123.

Refinements of the method correspondingly result from the designs of the arrangement.

In summary, an airbag arrangement having an actively locked airbag flap is provided which, when the airbag is ignited, is unlocked preferably by cables which also pull it behind a vehicle interior paneling, for example into the dashboard interior, in order thereby to make the way clear, so that the airbag does not emerge aggressively, which is also referred to as a "nonaggressive airbag". In addition, the present invention provides in particular an airbag flap which can be retracted into an airbag module and is held stably in the normal position by means of latching lugs or teeth or in general form-fitting locking devices and engagement devices. Furthermore, an airbag flap having a fabric composite of film, foam and base is provided. Also, the present invention provides an airbag flap which unlatches the airbag cover from its stable position by means of pull cables, and is pulled into the module.

The features and feature combinations of the exemplary embodiments reproduced above and in the drawings serve merely to elucidate the invention by way of example and not to limit it. The extent of disclosure of all the present documents is determined by what can readily be gathered by the expert in the claims, but also from the description, the drawing and the complete contents of the earlier applications of the present inventor which are specified at the beginning. In particular, the invention also includes all variations, modifications, combinations and substitutions which the expert can gather from the entire extent of disclosure of the present documents, including the abovementioned, earlier applications. In particular, all of the individual features and refinement options of the invention and their exemplary embodiments can be combined.

Designations
1 Airbag flap
2 Plug-in strip
3 Locking arrangement
4 Open position
5 Rest position
6 Dashboard
7 Pull cable
8 Airbag module
9 Retracting mechanism
10 Bent portion
11 Cable grommet
12 Transverse locking arrangement
12a Lug
13 Upper locking arrangement 14 Segments
14a Teeth
14b Teeth
14c Intermediate spaces
14d Intermediate spaces
15 Cable deflecting device
20 Airbag arrangement
21 Engagement devices
22 Plug-in groove
23 Airbag outlet opening
24 Locking devices
25 Driving devices
26 Gas generator
27 Locking bar
101 Airbag cover base
102 Dashboard support
103 Groove
104 Latching lugs (rectangular) dashboard support
105 Latching lugs (T-shaped) dashboard support
106 Latching lugs (rectangular) airbag cover base
107 Latching lugs (T-shaped) airbag cover base
108 Fabric connection, connecting fabric
109 Fitting groove
110 Latching plate
111 Latching lugs (rectangular) latching plate
112 Latching lugs (T-shaped) latching plate
113 Pull cable
114 Pull cable
115 Dashboard skin
116 Foam layer, damping layer
117 Airbag flap
118 Airbag flap
119 Airbag cover base
120 Cutting edge
121 Fabric tab
122 Strip
123 Wedge-shaped part
124 Inserted strip
125 Fabric tab
126 Pivotable plate
127 Holes
128 Teeth
129 Wedge-shaped pull cam
130 Slot
131 Slot
132 Hole
133 Fabric connection, connecting fabric
134 Fabric, connecting fabric
135 Plate
136 Plate
137 Latching lugs
138 Latching lugs
139 Hatched region
140 Clinching

What is claimed is:

1. An airbag arrangement, comprising:
an airbag flap which, prior to triggering of the airbag arrangement, is arranged in a closed position in an airbag outlet opening in a vehicle interior paneling, and which, as a consequence of triggering of the airbag arrangement, can be moved with respect to a vehicle occupant positioned in front of the vehicle interior paneling, out of the airbag outlet opening into an open position behind the vehicle interior paneling through the use of driving devices;

said airbag flap being hold in its closed position in the airbag outlet opening in a form-fitting manner through the use of engagement devices and locking devices, said engagement devices and said locking devices forming one of a support and a seat for said airbag flap when said airbag flap is in the closed position in said airbag outlet opening against a movement of said airbag flap in a direction of the open position; and said engagement devices being assigned only to one side of the airbag flap and the airbag outlet opening, and as a consequence of triggering of the airbag arrangement, the locking devices can be released through the use of the driving devices, so that the airbag flap can be moved with respect to a vehicle occupant from its closed position in the airbag outlet opening into an open position behind the vehicle interior paneling.

2. The airbag arrangement as claimed in claim 1, wherein the engagement devices contain a plug-in groove and a plug-in strip which define a direction of longitudinal extent and which are arranged on and assigned to the airbag flap and the airbag outlet opening in such a manner that said plug-in groove and said plug-in strip can be moved apart from one another transversely with respect to the direction of longitudinal extent during movement of the airbag flap from its closed position into an open position.

3. The airbag arrangement as claimed in claim 1, characterized in that the locking devices are assigned to at least one side of the airbag flap and/or airbag outlet opening.

4. The airbag arrangement as claimed in claim 3, characterized in that the locking devices are assigned to a plurality of sides of the airbag flap and/or airbag outlet opening.

5. The airbag arrangement as claimed in claim 1, characterized in that the locking devices can be released transversely with respect to the opening movement of the airbag flap from its closed position into an open position.

6. The airbag arrangement as claimed in claim 5, characterized in that the locking devices contain at least one pair of teeth with one tooth assigned in each case to the airbag flap and the airbag outlet opening, and in that in the closed position of the airbag flap the teeth of each pair of teeth can be shifted through the use of the driving devices from a locking position, in which they oppose a movement of the airbag flap into its open position, into an unlocking position in which the movement of the airbag flap into its open position is released.

7. The airbag arrangement as claimed in claim 6, characterized in that a plurality of pairs of teeth is provided.

8. The airbag arrangement as claimed in claim 6, characterized in the tooth of the at least one pair of teeth which is assigned to the airbag flap can be shifted from its locking position into its unlocking position.

9. The airbag arrangement as claimed in claim 6, characterized in that all of the teeth which can be shifted between a locking position and an unlocking position are arranged on a common locking bar or on connected locking bars.

10. The airbag arrangement as claimed in claim 9, characterized in that the locking bar is a latching plate on which the tooth of the at least one pair of teeth is integrally formed.

11. The airbag arrangement as claimed in claim 6, characterized in that the teeth are designed in the manner of lugs or serrations.

12. The airbag arrangement as claimed in claim 11, characterized in that the teeth are designed as latching lugs or serrations.

13. The airbag arrangement as claimed in claim 6, characterized in that the teeth face one another with rectangular or T-like surfaces.

14. The airbag arrangement as claimed in claim 1, characterized in that the airbag flap is coupled via the locking devices to the driving devices for its movement from its closed position into an open position.

15. The airbag arrangement as claimed in claim 1, characterized in that the coupling of the airbag flap to the driving devices is configured in such a manner that when said airbag flap is triggered first of all the locking devices are released and then the airbag flap is moved.

16. The airbag arrangement as claimed in claim 1, characterized in that the driving devices contain at least one pyrotechnic propellant and a mechanism which can be acted upon therewith.

17. The airbag arrangement as claimed in claim 16, characterized in that the mechanism contains at least one pull cable which can be acted upon by the pyrotechnic propellant and via the locking devices engages in the airbag flap in such a manner that, when the pyrotechnic propellant is triggered, first of all the locking devices are released and afterward the airbag flap is moved.

18. The airbag arrangement as claimed in claim 1, including an airbag module containing a gas generator which is used for generating gas for inflating an airbag and at the same time operates as a driving source for the driving devices.

19. The airbag arrangement as claimed in claim 1, characterized in that the airbag flap contains an at least substantially stable flap base and a damping layer and an outer skin, and in that the locking devices engage on the flap base.

20. The airbag arrangement as claimed in claim 19, characterized in that beyond the airbag flap the outer skin and preferably also the damping layer is/are also constituent parts of the remaining vehicle interior paneling.

21. The airbag arrangement as claimed in claim 19, characterized in that the damping layer is a foam material layer.

22. The airbag arrangement as claimed in claim 19, characterized in that a connecting fabric which is connected fixedly to the outer skin is included between the damping layer and the outer skin for connection of the driving devices.

23. The airbag arrangement as claimed in claim 22, characterized in that the connecting fabric runs through the damping layer at least approximately and/or substantially along the circumference of the airbag flap.

24. The airbag arrangement as claimed in claim 19, characterized in that the airbag flap and/or the airbag outlet opening are assigned cutting devices which are configured and/or arranged in such a manner that during a movement of the airbag flap from its closed position into an open position the damping layer is automatically weakened or severed.

25. The airbag arrangement as claimed in claim 24, characterized in that the cutting devices are also configured for weakening or severing the outer skin.

26. A vehicle interior configuration, comprising:
   a vehicle interior paneling having an airbag outlet opening formed therein;
   an airbag arrangement having an airbag flap which, prior to triggering of the airbag arrangement, is arranged in a closed position in the airbag outlet opening in the vehicle interior paneling, and which, as a consequence of triggering of the airbag arrangement, can be moved with respect to a vehicle occupant positioned in front of the vehicle interior paneling, out of the airbag outlet opening into an open position behind the vehicle interior paneling through the use of driving devices;
   said the airbag flap being held in its closed position in the airbag outlet opening in a form-fitting manner through the use of engagement devices and locking devices, said engagement devices and said locking devices forming one of a support and a seat fox said airbag flap when said airbag flap is in the closed position in said airbag outlet opening against a movement of said airbag flap in a direction of the open position; and
   said engagement devices being assigned only to one side of said airbag flap and said airbag outlet opening, and, as a consequence of a triggering of said airbag arrangement, said locking devices can be released through the use of said driving devices, such that said airbag flap can be moved with respect to a vehicle occupant from its closed position in said airbag outlet opening into an open position behind the vehicle interior paneling.

27. An operating method for an airbag arrangement, the method which comprises:
   causing, by triggering the airbag arrangement, an airbag flap to be moved with respect to a vehicle occupant positioned in front of the vehicle interior paneling, from a closed position in an airbag outlet opening in a vehicle interior paneling into an open position behind the vehicle interior paneling through the use of driving devices, wherein prior to a movement of the airbag flap from its closed position into an open position driving devices release locking devices which hold the airbag flap until then in a form-fitting manner in the airbag outlet opening such that engagement devices and the locking devices form one of a support and a seat for the airbag flap when the airbag flap is in the closed position in the airbag outlet opening against a movement of the airbag flap in a direction of the open position; and
   automatically disengaging the engagement devices, which hold the airbag flap in its closed position in a form-fitting manner in the airbag outlet opening, when moving the airbag flap from its closed position into an open position.

28. The operating method as claimed in claim 27, characterized in that the release of the locking devices takes place transversely with respect to the opening movement of the airbag flap from its closed position into an open position.

29. The operating method as claimed in claim 27, characterized in that one tooth of at least one pair of teeth is shifted from an at least partially overlapping locking position into an unlocking position in which the movement of the airbag flap into its open position is released.

30. The operating method as claimed in claim 27, characterized in that after the release of the locking devices the driving devices automatically engage on the airbag flap and move the latter from its closed position into an open position.

31. The operating method as claimed in claim 27, characterized in that an airbag is inflated with gas from a gas generator and emerges from the vehicle interior paneling through the airbag outlet opening after the airbag flap has reached an open position.

32. The operating method as claimed in claim 31, characterized in that the release of the locking devices and/or the opening of the airbag flap is/are driven through the use of the gas generator.

33. The operating method as claimed in claim 27, characterized in that prior to or during the opening of the airbag flap a damping layer and/or an outer skin of the airbag flap and of the remaining vehicle interior paneling is/are weakened or severed at least approximately and/or substantially along the circumference of said airbag flap through the use of cutting devices.

* * * * *